N. A. BOYNTON.

Heating-Stove.

No. 6,251. Reissued Jan. 26, 1875.

WITNESSES.

Walter Allen

H. F. Tanner

INVENTOR

Nathaniel A. Boynton

By Knight Bros Attorneys

THE GRAPHIC CO. PHOTO-LITH. 39 & 41 PARK PLACE, N.Y.

UNITED STATES PATENT OFFICE.

NATHANIEL A. BOYNTON, OF NEW YORK, N. Y.

IMPROVEMENT IN HEATING-STOVES.

Specification forming part of Letters Patent No. 116,674, dated July 4, 1871; reissue No. 6,251, dated January 26, 1875; application filed May 7, 1874.

*To all whom it may concern:*

Be it known that I, NATHANIEL A. BOYNTON, of the city, county, and State of New York, have invented certain new and useful Improvements in Heating-Stoves, of which the following is a specification:

My improved stove is constructed with a vertical grated fire-pot, encircled by slanting plates, which form a shell or guard around the said fire-pot, and have, at or near their junction or largest diameter, an outwardly-projecting horizontal plate or fender.

The upper of the two plates, which converges upward, is provided with illuminating-windows, through which light and heat are radiated upward from the red-hot grated fire-pot and the incandescent fuel within it. The lower slanting plate, which converges downward toward the horizontal fire-grate, serves on its inside to conduct ashes into the ash-pan or drawer, and on its outside as a heating-surface for air and a downwardly-radiating surface. The fender, in addition to functions implied by its name, serves to deflect outward and disperse the air which rises by heat imparted by contact with the slanting plate beneath it.

My improvements particularly consist, first, in the employment of a grated fire-pot projecting downward from its place of attachment, in combination with an external illuminated plate united at its upper margin to the said grated fire-pot, and slanting downward and outward, so as to permit the radiation upward through its windows of light and heat from the grated fire-pot and the incandescent fuel within it; second, in the combination, with the aforesaid grated fire-pot, of a plate surrounding its lower part, and slanting downward and inward, so as to radiate heat downward to the floor, and conduct ashes inward to the ash-pan; third, in the combination of two slanting plates constituting a shell surrounding the aforesaid grated fire-pot, and inclosing a flueless or dead-air chamber, from which heat is radiated, as hereinafter described.

Figure 1:
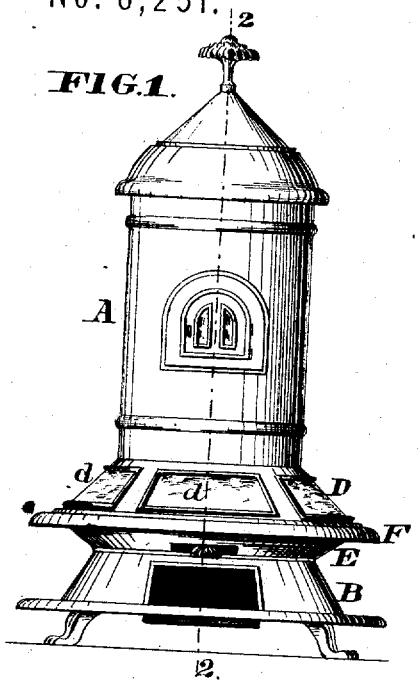
Figure 2:
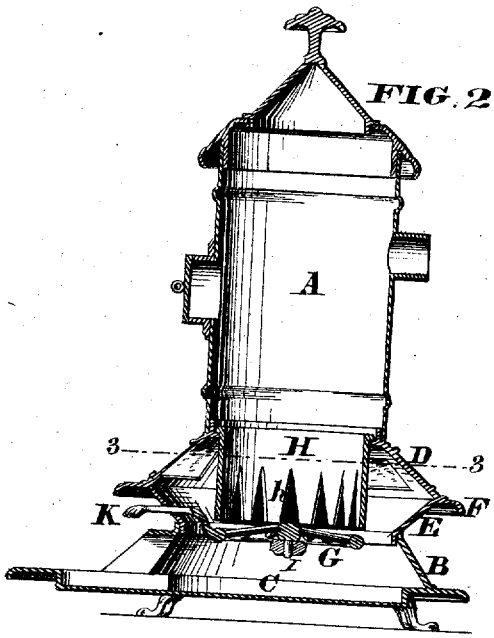
Figure 4:
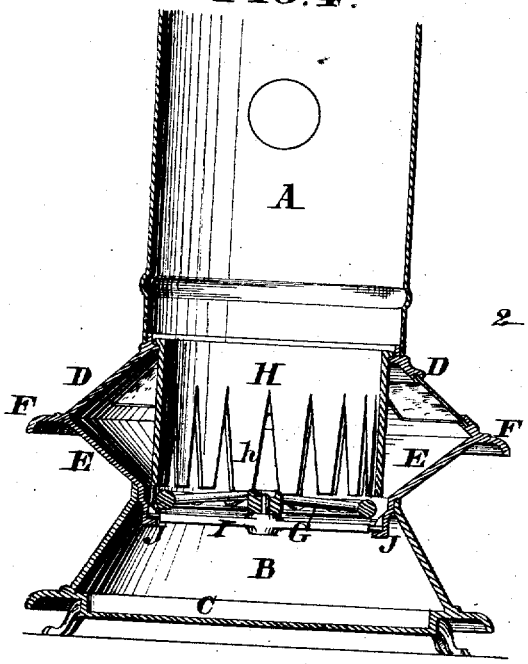
Figure 3:
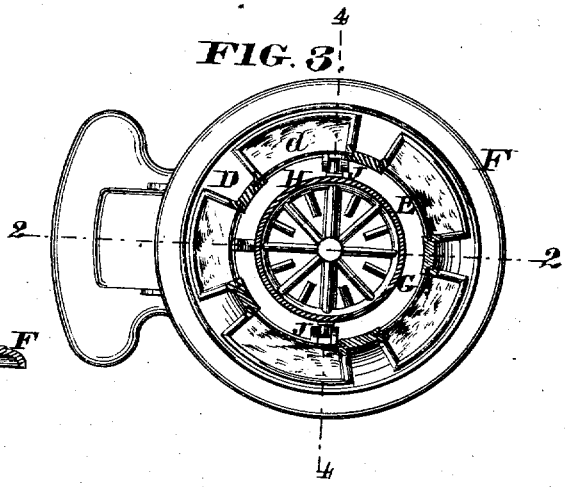

In the accompanying drawings, Figure 1 is a front view of a stove illustrating my invention. Fig. 2 is a vertical section of the same on the line 2 2, Figs. 1 and 3. Fig. 3 is a horizontal section thereof on the line 3 3, Fig. 2. Fig. 4 is a vertical section on the line 4 4, Fig. 2, and on a larger scale.

A may represent the body of a cylindrical stove of common construction; B, the base thereof, and C the ash-pit. D E represent a shell, consisting of an upper inclined plate, D, pierced for the reception of mica windows *d*, and a lower inclined plate, E, connected with the plate D at its largest diameter, from which point a flange or fender, F, projects horizontally outward. The shell or plates D E contain a grated fire-pot, H, said fire-pot being constructed with vertical bars *h*, within which the burning fuel is confined, and between which heat and light are radiated. The grated fire-pot H *h* is disconnected from the horizontal grate G. Through and around this grate G the draft to support combustion is supplied, passing upward within the grated fire-pot H *h*. The horizontal fire-grate G may be attached in a usual manner to a horizontal bar, I, supported by lugs J, formed on the lower margin of the inclined plate E. The upper margin of the plate D is of suitable diameter to fit the cylinder or body A, and the lower margin of the plate E may be united with the base B in any usual manner. K may represent a common shaking handle or key projecting horizontally from the grate G. The bars *h* of the grated fire-pot are preferably formed of such dimensions as to leave spaces between them fully equal to their own breadth, and the taper form of said bars causes the spaces between them to increase in width downward. Within this vertical annular grate or fire-pot the fuel is placed. The spaces between the bars *h* permit free radiation of light and heat from the incandescent fuel. The inclined windows *d* afford a very effective illumination, exposing to view the red-hot grated fire-pot, and the incandescent fuel within it. The lower inclined plate, E, conducts ashes inward to the ash-pan, and on its outside radiates heat directly to the floor, and also affords an effective heating-surface for air, the heated air, as it rises, being deflected outward and dispersed over the apartment by the flange F. The annular space between the grated fire-pot H *h* and the surrounding shell D E, being without flue-connections, will be seen to constitute a dead-air chamber, from which all the heat from the grated fire-pot H *h* and the fuel within it is radiated outward through the shell D E. This distinguishes my invention clearly from any in which the lower part of the fire-pot is surrounded by a combustion-chamber connecting with flues which carry off the gases and heat.

Either or both of the inclined or converging plates D E may be curved vertically, or otherwise varied in form to suit the taste, without departing from the essential principles of the invention. The shell D E may be applied as a supplemental base to stoves already in use.

The following is claimed as new:

1. The slanting plate D, provided with illuminating-windows *d*, in combination with a vertical grated fire-pot, H *h*, disconnected from the horizontal grate G.

2. The lower slanting plate, E, in combination with a vertical grated fire-pot, H *h*, constructed and applied as herein set forth, so that the entire draft of the stove is carried upward within the said fire-pot.

3. The outer shell or casing, consisting of the converging or oppositely-slanting plates D E, united at their common periphery, and surrounding the vertical grated fire-pot H *h*, said shell inclosing a dead-air or heat chamber without flue-connections, and radiating the heat upward and downward, as explained.

NATHANIEL A. BOYNTON.

Witnesses:

OCTAVIUS KNIGHT,
WALTER ALLEN.